US008651451B2

(12) United States Patent
Hong et al.

(10) Patent No.: US 8,651,451 B2
(45) Date of Patent: Feb. 18, 2014

(54) MICROFLUIDIC DEVICE WITH FLUID DRIVING CAPABILITY

(75) Inventors: Chien-Chong Hong, Zhubei (TW); Cheng-Han Tsai, Tainan (TW)

(73) Assignee: National Tsing Hua University, Hsinchu (TW)

( * ) Notice: Subject to any disclaimer, the term of this patent is extended or adjusted under 35 U.S.C. 154(b) by 371 days.

(21) Appl. No.: 13/198,743

(22) Filed: Aug. 5, 2011

(65) Prior Publication Data
US 2012/0241653 A1    Sep. 27, 2012

(30) Foreign Application Priority Data

Mar. 24, 2011    (TW) .............................. 100110130 A

(51) Int. Cl.
*F16K 31/02*    (2006.01)
(52) U.S. Cl.
USPC .................... 251/11; 251/129.06; 251/368
(58) Field of Classification Search
USPC ...................................... 251/11, 129.06, 368
See application file for complete search history.

(56) References Cited

U.S. PATENT DOCUMENTS

| 5,325,880 | A | * | 7/1994 | Johnson et al. ................. 251/11 |
| 5,964,744 | A | * | 10/1999 | Balbierz et al. ............... 604/530 |
| 5,975,485 | A | * | 11/1999 | Tsai et al. ........................ 251/11 |
| 6,033,191 | A | * | 3/2000 | Kamper et al. ............... 417/322 |
| 6,406,605 | B1 | * | 6/2002 | Moles ....................... 251/129.06 |
| 6,994,314 | B2 | * | 2/2006 | Garnier et al. ............ 251/129.06 |
| 7,168,680 | B2 | * | 1/2007 | Koeneman ............... 251/129.06 |
| 7,320,457 | B2 | * | 1/2008 | Heim et al. ............... 251/129.06 |
| 7,607,634 | B2 | * | 10/2009 | Browne et al. ........... 251/129.01 |
| 2005/0212630 | A1 | * | 9/2005 | Buckley et al. ................. 335/35 |
| 2006/0036045 | A1 | * | 2/2006 | Wilson et al. ................. 525/452 |

* cited by examiner

*Primary Examiner* — John Bastianelli
(74) *Attorney, Agent, or Firm* — Birch, Stewart, Kolasch & Birch, LLP

(57) ABSTRACT

A microfluidic device includes: a shape memory substrate having a shape memory polymer matrix and a plurality of particles embedded in the shape memory polymer matrix, the shape memory polymer matrix being thermally transformable from a temporary shape to an original shape, the particles being made from a magnetically coercive material; and a microfluidic chip attached sealingly to the shape memory substrate and defining a microfluidic channel. The shape memory polymer matrix is indented inwardly to form an indented space in fluid communication with the microfluidic channel when the shape memory polymer matrix is heated to transform from the temporary shape to the original shape.

8 Claims, 3 Drawing Sheets

MICROFLUIDIC DEVICE WITH FLUID DRIVING CAPABILITY

CROSS-REFERENCE TO RELATED APPLICATION

This application claims priority of Taiwanese application no. 100110130 filed on Mar. 24, 2011.

BACKGROUND OF THE INVENTION

1. Field of the Invention

The invention relates to a microfluidic device including a microfluidic chip and a shape memory substrate attached to the microfluidic chip for creating a temporary vacuum to induce fluid flow within the microfluidic chip.

2. Description of the Related Art

Conventional microfluidic devices require external driving means to transport a liquid into or out of a microfluid channel in the microfluidic device, which complicates the assembly of the microfluidic device and the external driving means. In addition, most external driving means are incompatible with microfluidic devices for biochemical applications.

U.S. Patent Application Publication No. 2006/0036045 discloses a valve actuator of a shape memory polymer. The valve actuator is operable to block the flow of a fluid in a fluid passage. The shape memory polymer can be transformed into a different shape by heating using laser or a resistive-type heater.

U.S. Patent Publication No. 2005/0212630 discloses a shape memory polymer containing magnetic particles. The shape memory polymer can be heated by applying an alternate magnetic field to the magnetic particles. The energy of the alternate magnetic field is converted into heat through magnetic hysteresis loss of the magnetic particles.

The entire disclosure of U.S. Patent Application Publication No. 2005/0212630 is incorporated herein by reference.

SUMMARY OF THE INVENTION

The object of the present invention is to provide a microfluidic device that can overcome the aforesaid drawbacks associated with the conventional fluidic devices equipped with external driving means.

According to the present invention, there is provided a microfluidic device that comprises: a shape memory substrate having a shape memory polymer matrix and a plurality of particles embedded in the shape memory polymer matrix, the shape memory polymer matrix being thermally transformable from a temporary shape to an original shape, the particles being made from a magnetically coercive material capable of converting energy of an alternate magnetic field into heat through magnetic hysteresis loss of the particles when the alternate magnetic field is applied to the particles; and a microfluidic chip attached sealingly to the shape memory substrate and defining a microfluidic channel that has an open end. The open end of the microfluidic channel is sealingly covered by the shape memory polymer matrix. The shape memory polymer matrix is indented inwardly to form an indented space in fluid communication with the microfluidic channel through the open end of the microfluidic channel when the shape memory polymer matrix is heated to transform from the temporary shape to the original shape, thereby creating a temporary vacuum within the microfluidic channel.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENT

Figure 1:
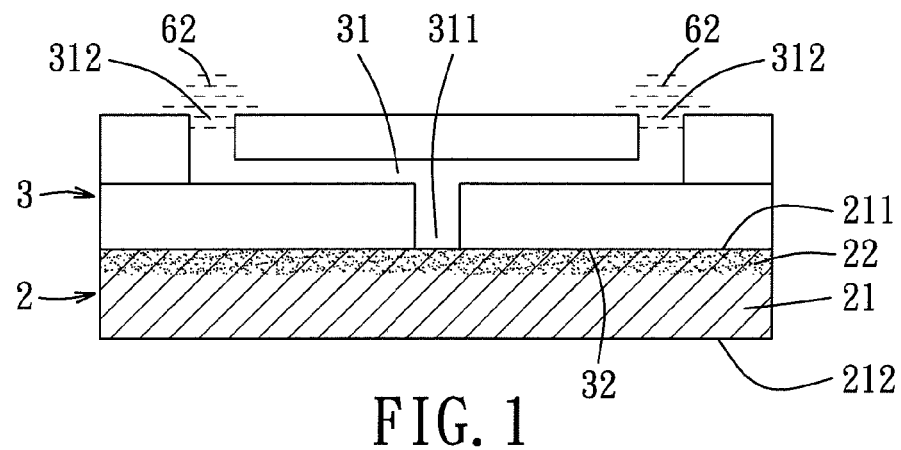
FIG. 1 is a schematic partly sectional view of the preferred embodiment of a microfluidic device according to this invention, illustrating a state where a shape memory polymer matrix of the preferred embodiment has a temporary shape.
Figure 2:
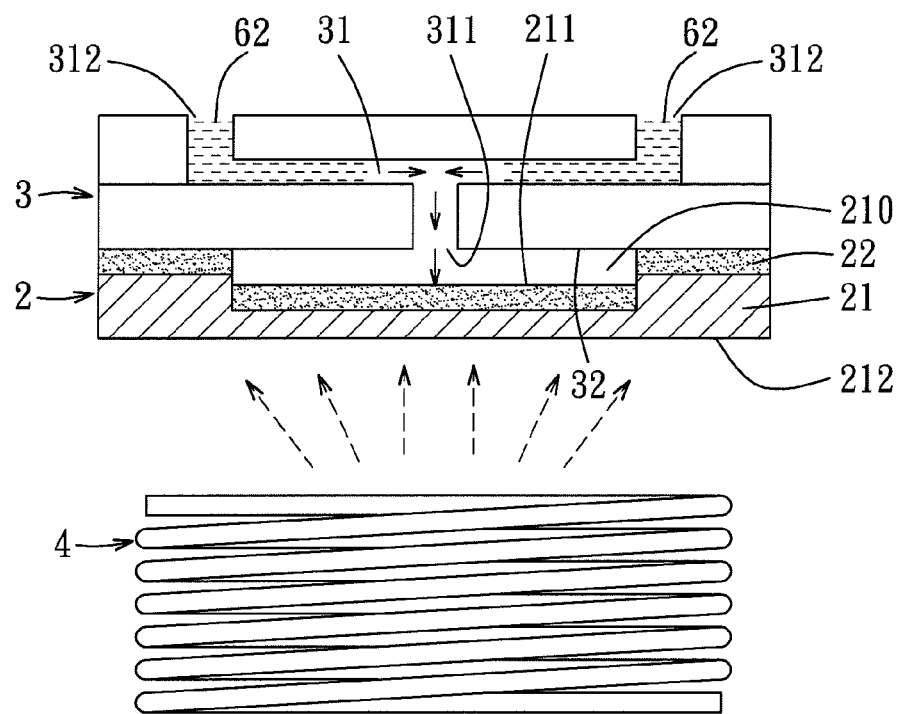
FIG. 2 is a schematic partly sectional view of the preferred embodiment, illustrating a state where the shape memory polymer matrix of the preferred embodiment is transformed into an original shape by an alternate magnetic field generated by a magnetic coil.
Figure 3A:
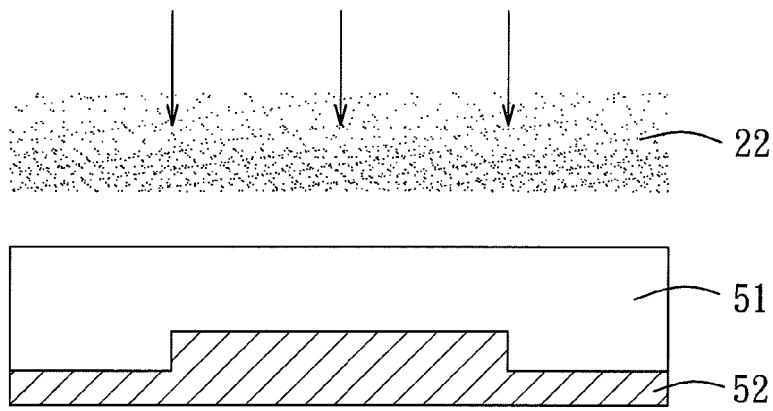
FIGS. 3A to 3D are schematic partly sectional views illustrating consecutive steps of a method of making the preferred embodiment.
Figure 3B:
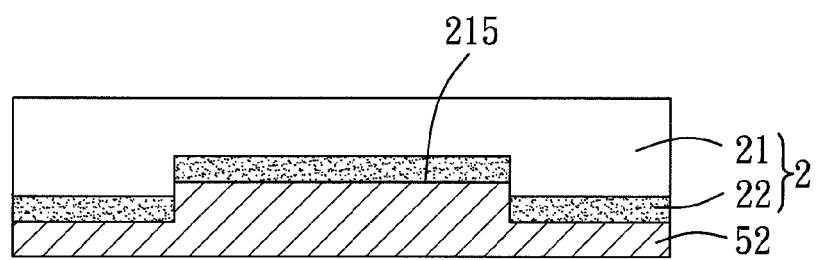
Figure 3C:
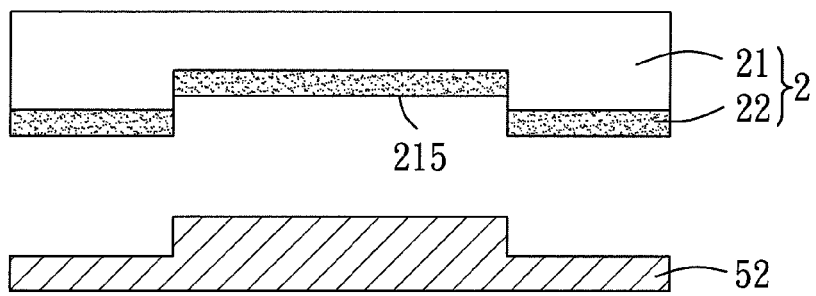
Figure 3D:
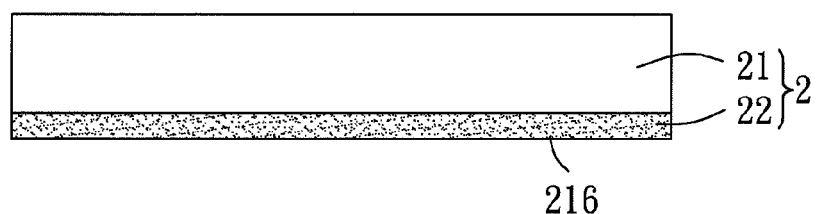

FIGS. 1 and 2 illustrate the preferred embodiment of a microfluidic device according to the present invention. The microfluidic device includes: a shape memory substrate 2 having a shape memory polymer matrix 21 and a plurality of particles 22 embedded in the shape memory polymer matrix 21, the shape memory polymer matrix 21 being thermally transformable from a temporary shape (see FIG. 1) to an original shape (see FIG. 2), the particles 22 being made from a magnetically coercive material capable of converting energy of an alternate magnetic field into heat through magnetic hysteresis loss of the particles 22 when the alternate magnetic field is applied to the particles 22, thereby permitting heating of the shape memory polymer matrix 21, the alternate magnetic field being preferably generated using a magnetic coil 4 which is disposed adjacent to the shape memory polymer matrix 21 to facilitate generation of the heat; and a microfluidic chip 3 attached sealingly to the shape memory substrate 2 and defining a microfluidic channel 31 that has an open end 311 and two inlets 312. The open end 311 of the microfluidic channel 31 is sealingly covered by the shape memory polymer matrix 21. The shape memory polymer matrix 21 is indented inwardly to form an indented space 210 in fluid communication with the microfluidic channel 31 through the open end 311 of the microfluidic channel 31 when the shape memory polymer matrix 21 is heated to transform from the temporary shape to the original shape, thereby creating a temporary vacuum within the microfluidic channel 31 for inducing fluids 62 disposed at the inlets 312 of the microfluidic channel 31 to flow into the microfluidic channel 31 in a direction toward the open end 311 of the microfluidic channel 31. The number of the inlets 312 of the microfluidic channel 31 and the number of the microfluidic channel 31 can vary according to the actual requirements.

The shape memory polymer matrix 21 has a contact surface 211 and an opposite surface 212. The particles 22 are disposed adjacent to the contact surface 211. The open end 311 of the microfluidic channel 31 is disposed at a bottom surface 32 of the microfluidic chip 3. The contact surface 211 of the shape memory polymer matrix 21 is attached to the bottom surface 32 of the microfluidic chip 3, and covers the open end 311 of the microfluidic channel 31 when the shape memory polymer matrix 21 has the temporary shape. When the shape memory polymer matrix 21 transforms from the temporary shape to the original shape, the contact surface 211 of the shape memory polymer matrix 21 is indented inwardly to form the indented space 210. In this embodiment, the shape of the opposite surface 212 remains unchanged during shape transformation of the shape memory polymer matrix 21.

Examples of the material of the shape memory polymer matrix 21 may include those disclosed in U.S. Patent Application Publication No. 2005/0212630. Preferably, the shape memory polymer matrix 21 is made from a polymer composition including methyl methacrylate monomer, butyl methacrylate monomer, polyhedral oligosilsesquioxane, a crosslinking agent of tetraethylene glycol dimethacrylate (TEGDMA), and an initiator selected from 2, 2-azobisisobutyronitrile (AIBN), 1,1-azobiscyclohexanecarbonitrile (ABCN), and the combination thereof.

The magnetically coercive material is preferably selected from nickel, ferric oxide, and the combination thereof, and is more preferably nickel.

The particles 22 of the magnetically coercive material have a particle size ranging from 10 to 100 nm. When the particle size is less than 10 nm, the magnetic force of the particles 22 is too weak to generate sufficient heat for heating the shape memory polymer matrix 21, and when the particle size is greater than 100 nm, formation of the shape memory substrate 2 becomes difficult. The particles 22 preferably have a generally spherical shape or a fiber-like shape.

FIGS. 3A to 3D illustrate consecutive steps of a method of making the shape memory substrate 2 using the aforesaid polymer composition as an example. The method includes: mixing methyl methacrylate monomer, butyl methacrylate monomer, polyhedral oligosilsesquioxane, TEGDMA, and AIBN to form a solution 51; applying the solution 51 onto a top surface of a mold 52 having a protruding pattern (see FIG. 3A); applying nickel nanoparticles 22 onto the solution 51, the nickel nanoparticles 22 sinking into a bottom of the solution 51 by virtue of gravity (see FIG. 3A); polymerizing and curing the solution 51 at 80° C. so as to form the shape memory substrate 2 including the shape memory polymer matrix 21 and the nickel nanoparticles 22 and having a recessed surface 215 that has a recess with a shape corresponding to that of the protruding pattern (see FIG. 3B); removing the shape memory substrate 2 from the mold 52 (see FIG. 3C); and hot embossing the shape memory substrate 2 to transform the recessed surface 215 into a flat surface 216 that is free of the recess (see FIG. 3D). The shape memory substrate 2 thus formed exhibits shape memory ability.

Preparation of the microfluidic chip 3 is well known in the art and will not be described herein for the sake of brevity. It is noted that the number of the recessed surface 215 or the indented space 210 operatively created at the recessed surface 215 can vary and multiple microfluidic channels 31 and multiple recessed surfaces 215 can be formed in a single microfluidic device or in multiple intercommunicated microfluidic devices according to actual requirements.

By utilizing the shape memory substrate 2 as a source of creating a temporary vacuum in the microfluidic chip 3 of the microfluidic device of this invention, the aforesaid drawbacks associated with the conventional fluidic devices equipped with the external driving means can be eliminated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A microfluidic device with fluid driving capability, comprising:
    a shape memory substrate having a shape memory polymer matrix and a plurality of particles embedded in said shape memory polymer matrix, said shape memory polymer matrix being thermally transformable from a temporary shape to an original shape, said particles being made from a magnetically coercive material capable of converting energy of an alternate magnetic field into heat through magnetic hysteresis loss of said particles when the alternate magnetic field is applied to said particles; and
    a microfluidic chip attached sealingly to said shape memory substrate and defining a microfluidic channel that has an open end, said open end of said microfluidic channel being sealingly covered by said shape memory polymer matrix, said shape memory polymer matrix being indented inwardly to form an indented space in fluid communication with said microfluidic channel through said open end of said microfluidic channel when said shape memory polymer matrix is heated to transform from the temporary shape to the original shape, thereby creating a temporary vacuum within said microfluidic channel.

2. The microfluidic device of claim 1, wherein said shape memory polymer matrix is made from a polymer composition including methyl methacrylate monomer and butyl methacrylate monomer.

3. The microfluidic device of claim 2, wherein said polymer composition further includes polyhedral oligosilsesquioxane.

4. The microfluidic device of claim 1, wherein said magnetically coercive material is selected from nickel, ferric oxide, and the combination thereof.

5. The microfluidic device of claim 4, wherein said magnetically coercive material is nickel.

6. The microfluidic device of claim 1, wherein said particles have a particle size ranging from 10 to 100 nm.

7. The microfluidic device of claim 1, wherein said particles have a generally spherical shape or a fiber-like shape.

8. The microfluidic device of claim 1, wherein said shape memory polymer matrix has a contact surface, said particles being disposed adjacent to said contact surface, said contact surface being attached to said microfluidic chip and covering said open end of said microfluidic channel.

* * * * *